United States Patent
Takata et al.

(10) Patent No.: US 11,830,681 B2
(45) Date of Patent: Nov. 28, 2023

(54) SOLID ELECTROLYTIC CAPACITOR AND METHOD OF MANUFACTURING THE SAME

(71) Applicant: TOKIN CORPORATION, Sendai (JP)

(72) Inventors: Hitoshi Takata, Tokyo (JP); Hiromasa Tanaka, Tokyo (JP)

(73) Assignee: TOKIN CORPORATION, Miyagi (JP)

( * ) Notice: Subject to any disclaimer, the term of this patent is extended or adjusted under 35 U.S.C. 154(b) by 0 days.

(21) Appl. No.: 17/853,610

(22) Filed: Jun. 29, 2022

(65) Prior Publication Data
US 2023/0011445 A1    Jan. 12, 2023

(30) Foreign Application Priority Data
Jul. 6, 2021 (JP) ................................ 2021-112244

(51) Int. Cl.
*H01G 9/012* (2006.01)
*H01G 9/15* (2006.01)
*H01G 9/04* (2006.01)
*H01G 9/052* (2006.01)

(52) U.S. Cl.
CPC .............. *H01G 9/012* (2013.01); *H01G 9/15* (2013.01); *H01G 9/0525* (2013.01); *H01G 2009/05* (2013.01)

(58) Field of Classification Search
CPC ...................................................... H01G 9/012
USPC ................................................. 361/540, 531
See application file for complete search history.

(56) References Cited

U.S. PATENT DOCUMENTS

| 2012/0275083 A1* | 11/2012 | Yamanaka | H01G 9/028 29/25.03 |
| 2013/0321985 A1 | 12/2013 | Djebara et al. | |
| 2013/0321986 A1 | 12/2013 | Djebara et al. | |
| 2015/0318118 A1* | 11/2015 | Ham | H01G 13/003 29/25.03 |

FOREIGN PATENT DOCUMENTS

| JP | 2002151356 A | * | 5/2002 | ............ H01G 9/012 |
| JP | 4798717 B2 | | 8/2011 | |
| JP | 2013251543 A | | 12/2013 | |
| JP | 2018147926 A | * | 9/2018 | |

* cited by examiner

*Primary Examiner* — Eric W Thomas
(74) *Attorney, Agent, or Firm* — Holtz, Holtz & Volek PC

(57) ABSTRACT

A solid electrolytic capacitor includes a capacitor element, an anode terminal and a cathode terminal. The capacitor element includes an anode body, a dielectric layer, a solid electrolytic layer, a conductive layer and an anode lead wire. The anode lead wire is partially embedded in the anode body and extends in a horizontal direction from the anode body. The anode lead wire has a thicker portion and a thinner portion. The thinner portion is positioned closer to the anode body than the thicker portion is in the horizontal direction. The anode terminal at least has a first end, a second end and an overlapping portion. The anode terminal is connected to the anode lead wire under a state where the first end of the anode terminal is positioned on the thinner portion while the overlapping portion of the anode terminal overlaps with the thicker portion.

5 Claims, 5 Drawing Sheets

SOLID ELECTROLYTIC CAPACITOR AND METHOD OF MANUFACTURING THE SAME

CROSS REFERENCE TO RELATED APPLICATIONS

This application is based on and claims priority under 35 U.S.C. § 119 to Japanese Patent Application No. JP2021-112244 filed Jul. 6, 2021, the contents of which are incorporated herein in their entirety by reference.

BACKGROUND OF THE INVENTION

This invention relates to a solid electrolytic capacitor, which comprises a capacitor element and an outer cathode terminal, and to a method of manufacturing the solid electrolytic capacitor.

Patent Document 1 (JPB4798717) discloses a solid electrolytic capacitor 900 of this type. As shown in FIG. 10, the solid electrolytic capacitor 900 of Patent Document 1 comprises a capacitor element 910, an outer mold 920, an anode terminal 930 and a cathode terminal 940. The capacitor element 910 comprises an anode body 912, a solid electrolytic layer 914, a conductive layer 916 and an anode lead wire 918. The anode body 912 is formed of a valve metal. A surface of the anode body 912 is formed with a dielectric layer 913. The solid electrolytic layer 914 is formed on the dielectric layer 913. The conductive layer 916 is formed on the solid electrolytic layer 914. The anode lead wire 918 is formed by extending an end of the anode body 912 outward. Specifically, the anode lead wire 918 is partially embedded in the anode body 912 and extends in a horizontal direction from the anode body 912. The outer mold 920 covers the capacitor element 910. The anode terminal 930 is connected to the anode lead wire 918. The cathode terminal 940 is connected to the conductive layer 916.

Iron-nickel was generally used as a base metal of an anode terminal at the time of the filing of the patent application of Patent Document 1. In contrast, copper is used as a base metal of an anode terminal in recent years because a solid electrolytic capacitor is desired to have a further reduced equivalent series resistance (ESR). Copper has a lower melting point than iron-nickel. Accordingly, an anode terminal, whose base metal is copper, is easily melted when the anode terminal is resistance welded to an anode lead wire. In general, a resistance value of metal becomes higher when the metal is melted. Thus, if the solid electrolytic capacitor of Patent Document 1 is configured so that copper is used as a base metal of the anode terminal, a resistance value of a junction of the anode terminal and the anode lead wire might become too high due to the melting of the copper of the anode terminal when the anode terminal and the anode lead wire are resistance welded to each other, and this might cause abnormal heating at the junction.

SUMMARY OF THE INVENTION

It is therefore an object of the present invention to provide a method of manufacturing a solid electrolytic capacitor which is configured so that its anode terminal can be resistance welded to its anode lead wire without any problems even if copper is used as a base metal of the anode terminal, and to provide the solid electrolytic capacitor manufactured thereby.

One aspect (first aspect) of the present invention provides a method of manufacturing a solid electrolytic capacitor. The method comprising: a step of forming a capacitor element comprising an anode body, a dielectric layer, a solid electrolytic layer, a conductive layer and an anode lead wire, the anode body being formed of a valve metal, the dielectric layer being formed on a surface of the anode body, the solid electrolytic layer being formed on the dielectric layer, the conductive layer being formed on the solid electrolytic layer, the anode lead wire being partially embedded in the anode body and extends in a horizontal direction from the anode body, the anode lead wire having a thicker portion and a thinner portion, the thinner portion being positioned closer to the anode body than the thicker portion is in the horizontal direction, the thicker portion having an upper surface and a lower surface in an up-down direction perpendicular to the horizontal direction, the thinner portion having an upper surface and a lower surface in the up-down direction, the lower surface of the thinner portion and the lower surface of the thicker portion being flush with each other, the upper surface of the thinner portion being positioned below the upper surface of the thicker portion in the up-down direction; a step of partially arranging an anode terminal on the anode lead wire so that an end of the anode terminal is positioned above the thinner portion while an overlapping portion of the anode terminal, which is positioned closer to another end of the anode terminal than the end of the anode terminal is on the anode terminal, overlaps with the thicker portion; and a step of connecting the anode terminal and the anode lead wire with each other by arranging an upper electrode and a lower electrode so that each of the upper electrode and the lower electrode occupies an area corresponding to the thicker portion of the anode lead wire in the horizontal direction while each of the upper electrode and the lower electrode partially occupies an area corresponding to the thinner portion of the anode lead wire in the horizontal direction, followed by putting the end of the anode terminal and the thinner portion of the anode lead wire between the upper electrode and the lower electrode with the overlapping portion of the anode terminal and the thicker portion of the anode lead wire sandwiched between the upper electrode and the lower electrode, further followed by applying electric current between the upper electrode and the lower electrode with force applied to both of the upper electrode and the lower electrode in the up-down direction to carry out resistance welding of the anode terminal and the anode lead wire to each other.

Another aspect (second aspect) of the present invention provides a solid electrolytic capacitor comprising a capacitor element, an anode terminal and a cathode terminal. The capacitor element comprises an anode body, a dielectric layer, a solid electrolytic layer, a conductive layer and an anode lead wire. The anode body is formed of a valve metal. The dielectric layer is formed on a surface of the anode body. The solid electrolytic layer is formed on the dielectric layer. The conductive layer is formed on the solid electrolytic layer. The anode lead wire is partially embedded in the anode body and extends in a horizontal direction from the anode body. The anode lead wire has a thicker portion and a thinner portion. The thinner portion is positioned closer to the anode body than the thicker portion is in the horizontal direction. The thinner portion has an upper surface and a lower surface in an up-down direction perpendicular to the horizontal direction. The thicker portion has an upper surface and a lower surface in the up-down direction. The lower surface of the thinner portion and the lower surface of the thicker portion are flush with each other. The upper surface of the thinner portion is positioned below the upper surface of the thicker portion in the up-down direction. The anode terminal at least has a first end, a second end and an overlapping portion. On the anode terminal, the overlapping portion is positioned closer to the second end than the first end is. The anode terminal is connected to the anode lead wire under a state where the first end of the anode terminal is positioned on the thinner portion while the overlapping portion of the anode terminal overlaps with the thicker portion. The first end of the anode terminal has an upper surface in the up-down direction. The overlapping portion of the anode terminal has an upper surface in the up-down direction. The upper surface of the first end of the anode terminal and the upper surface of the overlapping portion of the anode terminal are flush with each other.

According to the present invention, the anode lead wire is pressed against the molten anode terminal as a welding of the anode terminal and the anode lead wire proceeds, and the anode terminal and the anode lead wire are brought into contact with each other not only at the thicker portion but also at the thinner portion. In other words, the contact area between the anode terminal and the anode lead wire is increased as the welding proceeds. This can prevent a resistance value of a junction of the anode terminal and the anode lead wire from becoming too high and thereby can prevent the junction from becoming too hot.

An appreciation of the objectives of the present invention and a more complete understanding of its structure may be had by studying the following description of the preferred embodiment and by referring to the accompanying drawings.

Figure 1:
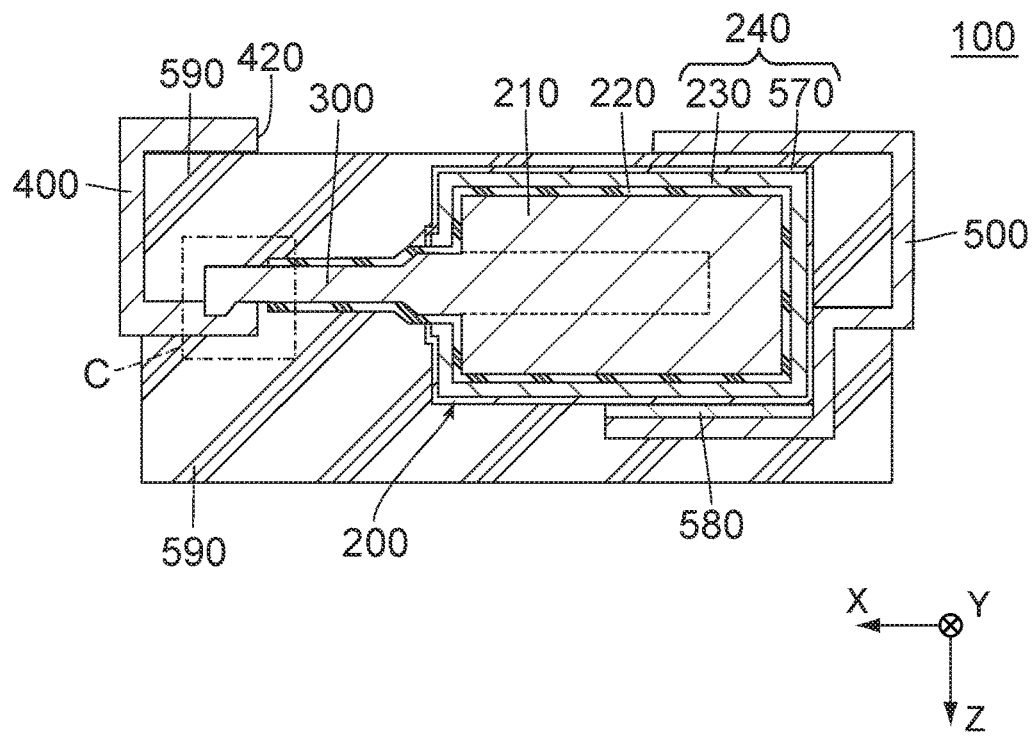
FIG. 1 is a cross-sectional view showing a solid electrolytic capacitor according to a first embodiment of the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

First Embodiment

As shown in FIG. 1, a solid electrolytic capacitor 100 according to a first embodiment of the present invention comprises a capacitor element 200, an anode terminal 400, a cathode terminal 500, a conductive resin 580 and an outer insulating member 590. A method of manufacturing the solid electrolytic capacitor 100 is described later.

As shown in FIG. 1, the capacitor element 200 of the present embodiment comprises an anode body 210, a dielectric layer 220, a cathode layer 240 and an anode lead wire 300.

Referring to FIG. 1, the anode body 210 of the present embodiment is formed of a valve metal. Specifically, the anode body 210 is a porous sintered body made of sintered valve metal powder. Specifically, the anode body 210 of the present embodiment includes the sintered valve metal powder and numerous vacancies. The sintered valve metal powder of the present embodiment is sintered tantalum powder.

Referring to FIG. 1, the dielectric layer 220 of the present embodiment is an anodic oxide layer, in particular a tantalum oxide layer. The dielectric layer 220 is formed on a surface of the anode body 210. In detail, the dielectric layer 220 is formed on both of the anode body 210 and a part of the anode lead wire 300.

As shown in FIG. 1, the cathode layer 240 of the present embodiment includes a solid electrolytic layer 230 and a conductive layer 570. The solid electrolytic layer 230 is formed on the dielectric layer 220. The conductive layer 570 is formed on the solid electrolytic layer 230. However, the present invention is not limited thereto. The cathode layer 240 may have another structure, provided that the cathode layer 240 includes the solid electrolytic layer 230. The cathode layer 240 is formed on the dielectric layer 220 to envelop the whole of the anode body 210. In other words, the dielectric layer 220 is positioned between the anode body 210 and the solid electrolytic layer 230.

The solid electrolytic layer 230 of the present embodiment is made of polyethylenedioxythiophene. In other words, the solid electrolytic layer 230 of the present embodiment is made of a conductive polymer. The solid electrolytic layer 230 is formed by repetition of immersing the anode body 210, on which the dielectric layer 220 is formed, in a conductive macromolecule solution and taking out and drying it. The conductive macromolecule solution includes an aqueous solution of ethylenedioxythiophene, an oxidant and a dopant. As the oxidant, various substances including an organic or inorganic iron salt may be used. As the dopant, various substances including a polystyrene sulfonic acid may be used.

The conductive layer 570 of the present embodiment is a laminated body of a carbon layer and a conductive paste layer. However, the present invention is not limited thereto. The conductive layer 570 may have a structure different from the laminated body of the carbon layer and the conductive paste layer. In the present embodiment, the conductive layer 570 is formed on the solid electrolytic layer 230. The carbon layer is formed by immersing the anode body 210, on which the solid electrolytic layer 230 is formed, in a solution including carbon black, a graphite filer and a binder and taking out and drying it. The conductive paste layer is formed by applying a silver paste onto a surface of the carbon layer and drying it.

Figure 2:
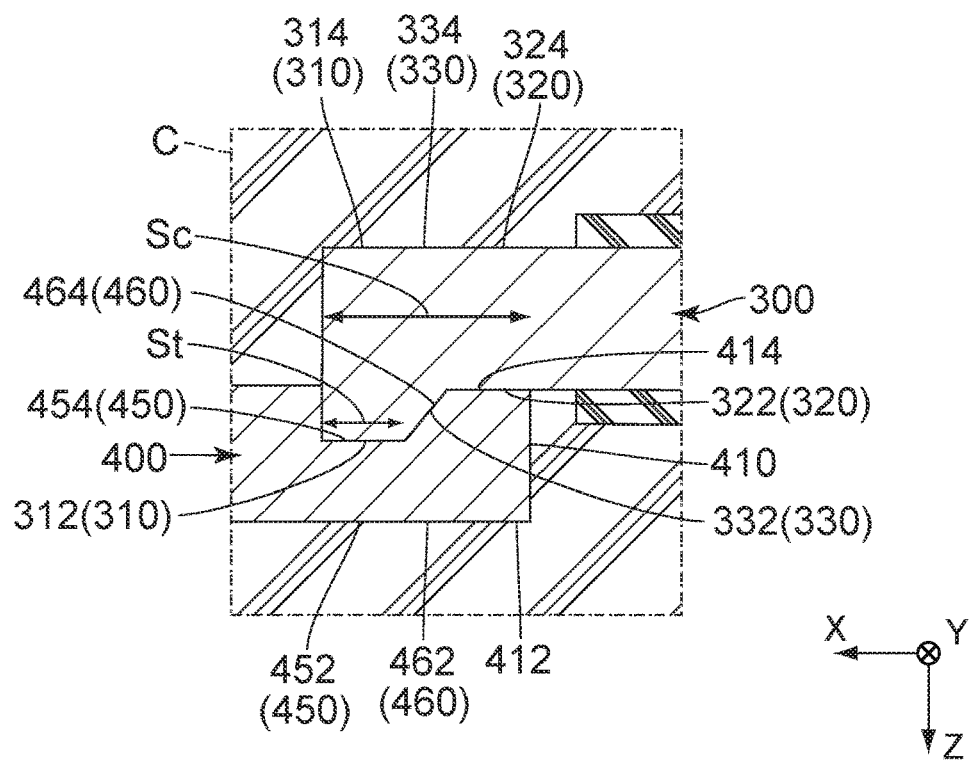
FIG. 2 is an enlarged view showing a part which is enclosed by dotted line C of FIG. 1.

Referring to FIG. 1, the anode lead wire 300 of the present embodiment is made of tantalum. The anode lead wire 300 is partially embedded in the anode body 210 and extends in a horizontal direction from the anode body 210. In the present embodiment, the horizontal direction is an X-direction. The horizontal direction is also referred to as a front-rear direction. Specifically, it is assumed that forward is a positive X-direction while rearward is a negative X-direction. A rear part of the anode lead wire 300 is embedded in the anode body 210. The anode lead wire 300 extends forward in the front-rear direction from the anode body 210. As shown in FIG. 2, the anode lead wire 300 has a thicker portion 310 and a thinner portion 320.

As shown in FIG. 2, the thicker portion 310 of the present embodiment is positioned at an end of the anode lead wire 300 in the horizontal direction. More specifically, the thicker portion 310 is positioned at a front end of the anode lead wire 300 in the front-rear direction. In an up-down direction perpendicular to the horizontal direction, a size of the thicker portion 310 is greater than a size of the thinner portion 320. In the present embodiment, the up-down direction is a Z-direction. Specifically, it is assumed that upward is a positive Z-direction while downward is a negative Z-direction. The thicker portion 310 has an upper surface 312 and a lower surface 314 in the up-down direction.

As understood from FIGS. 1 and 2, the thinner portion 320 of the present embodiment is positioned closer to the anode body 210 than the thicker portion 310 is in the horizontal direction. The thinner portion 320 has an upper surface 322 and a lower surface 324 in the up-down direction. The lower surface 324 of the thinner portion 320 and the lower surface 314 of the thicker portion 310 are flush with each other. The upper surface 322 of the thinner portion 320 is positioned below the upper surface 312 of the thicker portion 310 in the up-down direction perpendicular to the horizontal direction.

As shown in FIG. 2, the anode lead wire 300 has a coupling portion 330. However, the present invention is not limited thereto. The anode lead wire 300 may have no coupling portion 330. In other words, the thinner portion 320 and the thicker portion 310 may be directly coupled with each other so that there is a step between the thinner portion 320 and the thicker portion 310.

As shown in FIG. 2, the coupling portion 330 of the present embodiment is positioned between the thinner portion 320 and the thicker portion 310 in the horizontal direction. The coupling portion 330 is positioned rearward of the thicker portion 310 in the front-rear direction. The coupling portion 330 is positioned forward of the thinner portion 320 in the front-rear direction. The coupling portion 330 couples the thinner portion 320 and the thicker portion 310 with each other. The coupling portion 330 has an intersecting surface 332 and a lower surface 334. The intersecting surface 332 intersects with the up-down direction. The intersecting surface 332 intersects with the horizontal direction, or with the front-rear direction. However, the present invention is not limited thereto. Specifically, the intersecting surface 332 may not intersect with the up-down direction. The intersecting surface 332 may be a plane or curved surface. The intersecting surface 332 may have a step. The intersecting surface 332 may have irregularities. The intersecting surface 332 couples the upper surface 322 of the thinner portion 320 and the upper surface 312 of the thicker portion 310 with each other. The lower surface 334 of the coupling portion 330, the lower surface 324 of the thinner portion 320 and the lower surface 314 of the thicker portion 310 are flush with each other.

Referring to FIGS. 1 and 2, a base metal of the anode terminal 400 of the present embodiment is copper. Specifically, the anode terminal 400 is formed by plating nickel on the copper base metal. The anode terminal 400 has a first end 410, a second end 420, an overlapping portion 450 and an additional overlapping portion 460. On the anode terminal 400, the overlapping portion 450 is positioned closer to the second end 420 than the first end 410 is. The additional overlapping portion 460 is positioned between the first end 410 and the overlapping portion 450. However, the present invention is not limited thereto. Specifically, the anode terminal 400 should have at least the first end 410, the second end 420 and the overlapping portion 450 which is positioned closer to the second end 420 than the first end 410 is on the anode terminal 400. In other words, the anode terminal 400 may have no additional overlapping portion 460.

As shown in FIGS. 1 and 2, each of the first end 410 and the second end 420 of the present embodiment is a free end. The first end 410 has an upper surface 412 and a lower surface 414 in the up-down direction.

As shown in FIG. 2, the overlapping portion 450 of the present embodiment is positioned forward of the first end 410 in the front-rear direction. The overlapping portion 450 is positioned forward of the additional overlapping portion 460 in the front-rear direction. The overlapping portion 450 has an upper surface 452 and a lower surface 454 in the up-down direction.

As shown in FIG. 2, the additional overlapping portion 460 of the present embodiment is positioned between the first end 410 and the overlapping portion 450 in the horizontal direction. The additional overlapping portion 460 is positioned forward of the first end 410 in the front-rear direction. The additional overlapping portion 460 has an upper surface 462 and an oblique surface 464 in the up-down direction.

As shown in FIG. 2, the anode terminal 400 is connected to the anode lead wire 300 under a state where the first end 410 of the anode terminal 400 is positioned on the thinner portion 320 while the overlapping portion 450 of the anode terminal 400 overlaps with the thicker portion 310. More specifically, the anode terminal 400 is connected to the anode lead wire 300 under a state as follows: the first end 410 of the anode terminal 400 is positioned on the thinner portion 320; the additional overlapping portion 460 of the anode terminal 400 is positioned on the coupling portion 330; and the overlapping portion 450 of the anode terminal 400 overlaps with the thicker portion 310. The upper surface 412 of the first end 410 of the anode terminal 400 and the upper surface 452 of the overlapping portion 450 of the anode terminal 400 are flush with each other. More specifically, the upper surface 412 of the first end 410 of the anode terminal 400, the upper surface 462 of the additional overlapping portion 460 of the anode terminal 400 and the upper surface 452 of the overlapping portion 450 of the anode terminal 400 are flush with each other. The upper surface 312 of the thicker portion 310 is in contact with the lower surface 454 of the overlapping portion 450 in the up-down direction. The intersecting surface 332 of the coupling portion 330 is in contact with the oblique surface 464 of the additional overlapping portion 460 in the up-down direction. The upper surface 322 of the thinner portion 320 is in contact with the lower surface 414 of the first end 410 in the up-down direction.

Referring to FIG. 2, the thicker portion 310 has a size St in the horizontal direction, the solid electrolytic capacitor 100 has a junction which connects the anode terminal 400 and the anode lead wire 300 with each other, and the junction has a size Sc in the horizontal direction. The sizes St and Sc satisfy a condition St/Sc≤0.5. This facilitates a molten part of the anode terminal 400, which is welded to the anode lead wire 300, to be identified.

Referring to FIG. 1, the cathode terminal 500 of the present embodiment is made of a base member of 42 alloy plated with solder. However, the present invention is not limited thereto. Specifically, the cathode terminal 500 may be made of another metal.

Referring to FIG. 1, the conductive resin 580 of the present embodiment is made of silver paste. The cathode terminal 500 is bonded on the conductive layer 570 of the capacitor element 200 by using the conductive resin 580. Instead of the conductive resin 580, another conductive adhesive agent may be used.

Referring to FIG. 1, the outer insulating member 590 of the present embodiment is formed so that the outer insulating member 590 envelops both of a part of the anode terminal 400 and a part of the cathode terminal 500 while the outer insulating member 590 envelops the whole of the capacitor element 200. The outer insulating member 590 of the present embodiment is made of epoxy resin. The outer insulating member 590 is formed by injection molding with a metal mold of a predetermined shape, followed by hardening it. However, the present invention is not limited thereto. Specifically, the outer insulating member 590 may be made of another insulating material. Thus, the capacitor element 200 is sealed by the outer insulating member 590 from the outside of the solid electrolytic capacitor 100.

The solid electrolytic capacitor 100 of the present embodiment is manufactured as follows.

Figure 3:
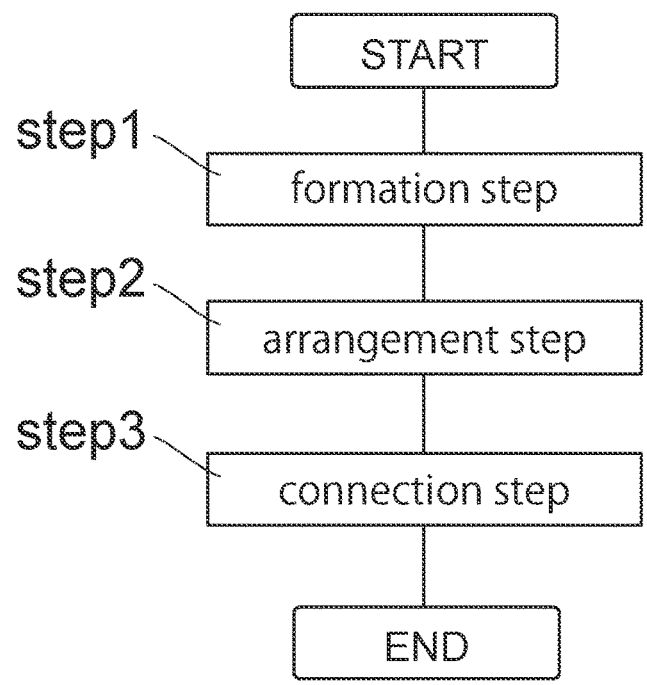
FIG. 3 is a flowchart showing manufacturing processes of the solid electrolytic capacitor of FIG. 1.

As shown in FIG. 3, the solid electrolytic capacitor 100 of the present embodiment is manufactured through a step 1 (formation step), a step 2 (arrangement step) and a step 3 (connection step). In other words, the manufacturing method of the solid electrolytic capacitor 100 comprises the formation step, the arrangement step and the connection step.

Referring to FIGS. 1 and 2, the formation step, through which the capacitor element 200 of the present embodiment is formed, is performed. Specifically, the capacitor element 200 is formed though the formation step, wherein: the capacitor element 200 comprises the anode body 210, the dielectric layer 220, the solid electrolytic layer 230, the conductive layer 570 and the anode lead wire 300; the anode body 210 is formed of the valve metal; the dielectric layer 220 is formed on the surface of the anode body 210; the solid electrolytic layer 230 is formed on the dielectric layer 220; the conductive layer 570 is formed on the solid electrolytic layer 230; the anode lead wire 300 is partially embedded in the anode body 210 and extends in the horizontal direction from the anode body 210; the anode lead wire 300 has the thicker portion 310 and the thinner portion 320; the thinner portion 320 is positioned closer to the anode body 210 than the thicker portion 310 is in the horizontal direction; the thicker portion 310 has the upper surface 312 and the lower surface 314 in the up-down direction; the thinner portion 320 has the upper surface 322 and the lower surface 324 in the up-down direction; the lower surface 324 of the thinner portion 320 and the lower surface 314 of the thicker portion 310 are flush with each other; and the upper surface 322 of the thinner portion 320 is positioned below the upper surface 312 of the thicker portion 310 in the up-down direction perpendicular to the horizontal direction. In the capacitor element 200, the anode lead wire 300 has the coupling portion 330. In detail, the coupling portion 330 couples the thinner portion 320 and the thicker portion 310 with each other and has the intersecting surface 332 which intersects with the up-down direction. The thicker portion 310, the thinner portion 320 and the coupling portion 330 of the anode lead wire 300 are press formed by a die. However, the method of forming the capacitor element 200, which includes the anode lead wire 300, is not limited thereto, and the capacitor element 200 can be formed by any known method in the art.

Figure 4:
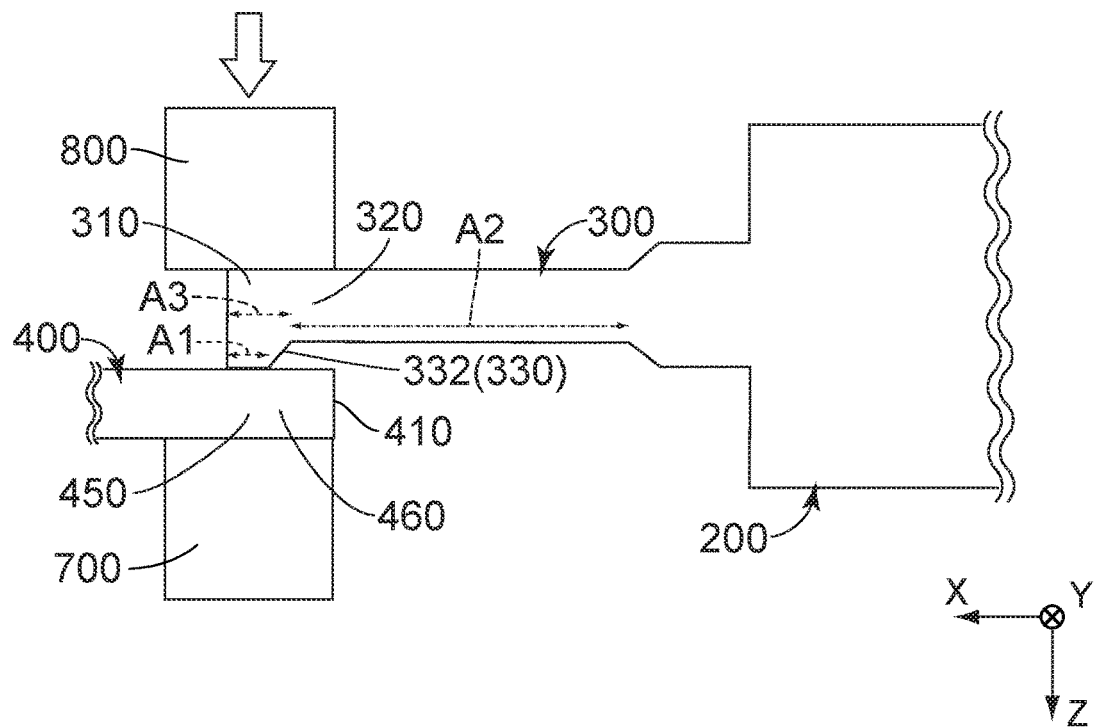
FIG. 4 is a cross-sectional view for explaining an arrangement process of a manufacturing method of the solid electrolytic capacitor of FIG. 1.

Referring to FIG. 4, the arrangement step is performed after the formation step is performed. Specifically, in the arrangement step, the anode terminal 400 is partially arranged on the anode lead wire 300 so that the first end 410 of the anode terminal 400 is positioned above the thinner portion 320 while the overlapping portion 450 of the anode terminal 400, which is positioned closer to the second end 420 of the anode terminal 400 than the first end 410 of the anode terminal 400 is on the anode terminal 400, overlaps with the thicker portion 310. More specifically, the anode terminal 400 is partially arranged on the anode lead wire 300 so that the first end 410 of the anode terminal 400 is positioned above the thinner portion 320, so that the additional overlapping portion 460 of the anode terminal 400 is positioned on the coupling portion 330, and so that the overlapping portion 450 of the anode terminal 400, which is positioned closer to the second end 420 of the anode terminal 400 than the first end 410 of the anode terminal 400 is on the anode terminal 400, overlaps with the thicker portion 310.

Figure 5:
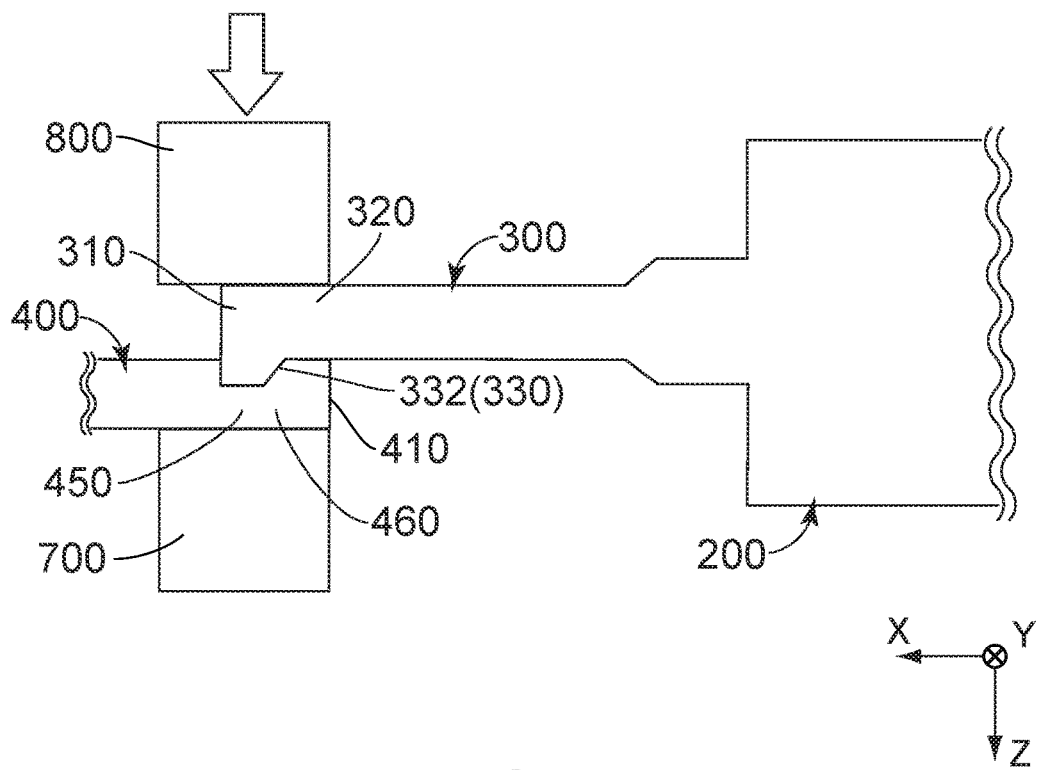
FIG. 5 is another cross-sectional view for explaining a connection process of the manufacturing method of the solid electrolytic capacitor of FIG. 1.

Referring to FIGS. 4 and 5, the connection step is performed after the arrangement step is performed. Specifically, in the connection step, the anode terminal 400 and the anode lead wire 300 are connected with each other by arranging an upper electrode 700 and a lower electrode 800 so that each of the upper electrode 700 and the lower electrode 800 occupies an area A1 corresponding to the thicker portion 310 of the anode lead wire 300 in the horizontal direction while each of the upper electrode 700 and the lower electrode 800 partially occupies an area A2 corresponding to the thinner portion 320 of the anode lead wire 300 in the horizontal direction, followed by putting the first end 410 of the anode terminal 400 and the thinner portion 320 of the anode lead wire 300 between the upper electrode 700 and the lower electrode 800 with the overlapping portion 450 of the anode terminal 400 and the thicker portion 310 of the anode lead wire 300 sandwiched between the upper electrode 700 and the lower electrode 800, further followed by applying electric current between the upper electrode 700 and the lower electrode 800 with force applied to both of the upper electrode 700 and the lower electrode 800 in the up-down direction to carry out resistance welding of the anode terminal 400 and the anode lead wire 300 to each other.

That is, in the connection step, the upper electrode 700 and the lower electrode 800 are firstly arranged so that each of the upper electrode 700 and the lower electrode 800 occupies the area A1 corresponding to the thicker portion 310 of the anode lead wire 300 in the horizontal direction while each of the upper electrode 700 and the lower electrode 800 partially occupies the area A2 corresponding to the thinner portion 320 of the anode lead wire 300 in the horizontal direction. More specifically, the upper electrode 700 and the lower electrode 800 are firstly arranged so that each of the upper electrode 700 and the lower electrode 800 occupies an area A3 corresponding to a combination of the thicker portion 310 and the coupling portion 330 of the anode lead wire 300 in the horizontal direction while each of the upper electrode 700 and the lower electrode 800 partially occupies the area A2 corresponding to the thinner portion 320 of the anode lead wire 300 in the horizontal direction. Next, the first end 410 of the anode terminal 400 and the thinner portion 320 of the anode lead wire 300 are put between the upper electrode 700 and the lower electrode 800 while the overlapping portion 450 of the anode terminal 400 and thicker portion 310 of the anode lead wire 300 are sandwiched between the upper electrode 700 and the lower electrode 800. More specifically, the first end 410 of the anode terminal 400 and the thinner portion 320 of the anode lead wire 300 are put between the upper electrode 700 and the lower electrode 800, the additional overlapping portion 460 of the anode terminal 400 and the coupling portion 330 of the anode lead wire 300 are put between the upper electrode 700 and the lower electrode 800, and the overlapping portion 450 of the anode terminal 400 and thicker portion 310 of the anode lead wire 300 are sandwiched between the upper electrode 700 and the lower electrode 800. At this time, the upper electrode 700 is in contact with any of the upper surface 412 (see FIG. 2) of the first end 410, the upper surface 462 (see FIG. 2) of the additional overlapping portion 460 and the upper surface 452 (see FIG. 2) of the overlapping portion 450 in the up-down direction. Additionally, at this time, the lower electrode 800 is in contact with any of the lower surface 324 (see FIG. 2) of the thinner portion 320, the lower surface 334 (see FIG. 2) of the coupling portion 330 and the lower surface 314 (see FIG. 2) of the thicker portion 310 in the up-down direction. Finally, in this state, electric current is applied between the upper electrode 700 and the lower electrode 800 while force is applied to both of the upper electrode 700 and the lower electrode 800 so that the upper electrode 700 and the lower electrode 800 approach each other in the up-down direction. Thus, the anode terminal 400 and the anode lead wire 300 are resistance welded to each other.

Referring to FIG. 2, in the solid electrolytic capacitor 100 manufactured through the connection step, the thicker portion 310 has the size St in the horizontal direction, the junction of the anode terminal 400 and the anode lead wire 300 has the size Sc in the horizontal direction, and the sizes St and Sc satisfy the condition St/Sc≤0.5. Thus, a contact area between the anode terminal 400 and the anode lead wire 300 at the beginning of the resistance welding of the anode terminal 400 and the anode lead wire 300 is not too large, and thereby weldability between the anode terminal 400 and the anode lead wire 300 is enhanced.

According to the manufacturing method of the present embodiment, the anode lead wire 300 is pressed against the molten anode terminal 400 as the welding of the anode terminal 400 and the anode lead wire 300 proceeds, and the anode terminal 400 and the anode lead wire 300 are brought into contact with each other not only at the thicker portion 310 but also at the thinner portion 320. In other words, the contact area between the anode terminal 400 and the anode lead wire 300 is increased as the welding of the anode terminal 400 and the anode lead wire 300 proceeds. This can prevent a resistance value of the junction of the anode terminal 400 and the anode lead wire 300 from becoming too high and thereby can prevent the anode terminal 400 from becoming too hot. Thus, the manufacturing method of the present embodiment prevents a molten portion of the anode terminal 400 from spreading to an area, where the anode body 210 is placed, when the anode terminal 400 and the anode lead wire 300 are resistance welded to each other.

In particular, according to the manufacturing method of the present embodiment, the anode lead wire 300 is pressed against the molten anode terminal 400 as the welding of the anode terminal 400 and the anode lead wire 300 proceeds in the connection step, and the anode terminal 400 and the anode lead wire 300 are brought into contact with each other not only at the thicker and thinner portion 310, 320 but also at the intersecting surface 332. In other words, the contact area between the anode terminal 400 and the anode lead wire 300 is gradually increased as the welding of the anode terminal 400 and the anode lead wire 300 proceeds. This can further prevent the resistance value of the junction of the anode terminal 400 and the anode lead wire 300 from becoming too high and thereby can further prevent the anode terminal 400 from becoming too hot. Thus, the manufacturing method of the present embodiment, in particular, prevents the molten portion of the anode terminal 400 from spreading to the area, where the anode body 210 is placed, when the anode terminal 400 and the anode lead wire 300 are resistance welded to each other.

It is assumed that a spherical molten portion is produced by melting of the anode terminal 400 in the connection step. In the manufacturing method of the present embodiment, the welding of the anode terminal 400 and the anode lead wire 300 begins at the thicker portion 310 which is positioned apart from the anode body 210. Accordingly, even if such a spherical molten portion is produced, the spherical molten portion is produced at a location which is positioned apart from the anode body 210. Thus, the solid electrolytic capacitor 100, which is manufactured by the manufacturing method of the present embodiment, provides a long migration path for metal ions, which might be produced from such a spherical molten portion in high temperature and high humidity conditions, toward the cathode layer 240. Consequently, an insulation defect hardly occur in the solid electrolytic capacitor 100 which is manufactured by the manufacturing method of the present embodiment.

After the aforementioned steps are performed, the cathode terminal 500 is connected to the capacitor element 200, and the capacitor element 200 is sealed with the outer insulating member 590. Thus, the manufacture of the solid electrolytic capacitor 100 of the present embodiment is completed.

Second Embodiment

Figure 6:
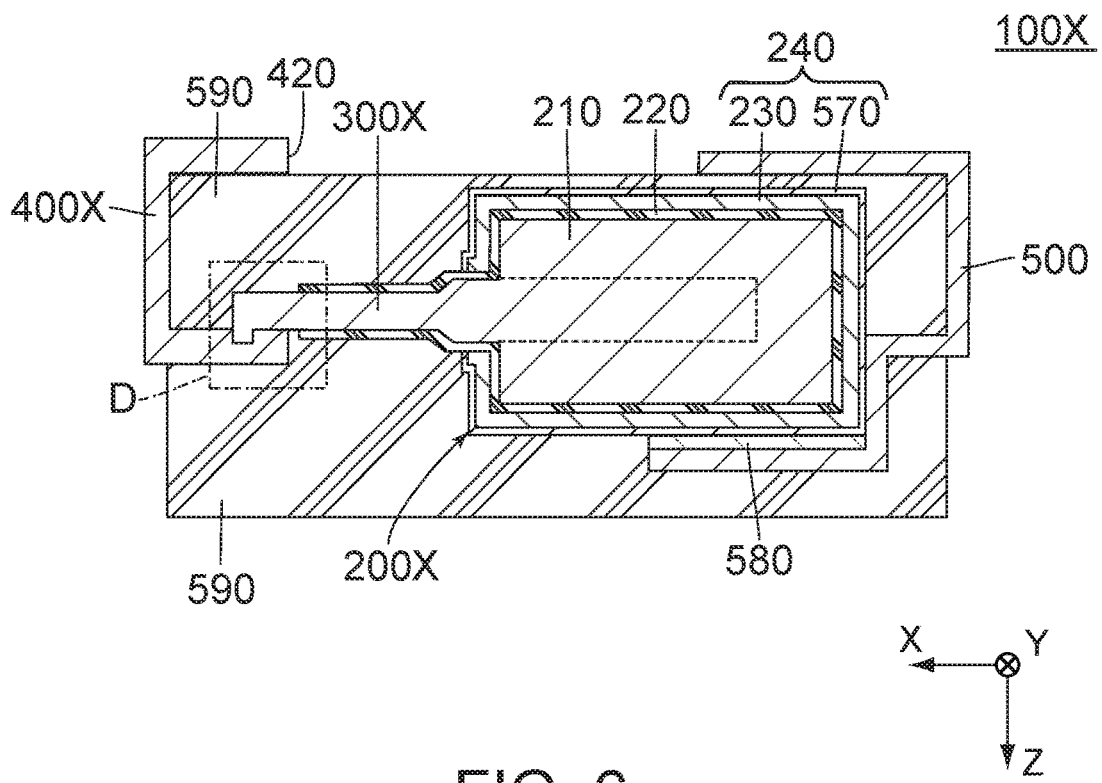
FIG. 6 is a cross-sectional view showing a solid electrolytic capacitor according to a second embodiment of the present invention.

As shown in FIG. 6, a solid electrolytic capacitor 100X according to a second embodiment of the present invention comprises a capacitor element 200X, an anode terminal 400X, a cathode terminal 500, a conductive resin 580 and an outer insulating member 590. The solid electrolytic capacitor 100X of the second embodiment has a structure similar to the structure of the solid electrolytic capacitor 100 of the first embodiment except for the capacitor element 200X and the anode terminal 400X. Accordingly, components similar to those of the first embodiment among components of the second embodiment will be designated by the same reference numerals as those of the first embodiment, and detail explanation thereabout will be omitted. As for directions and orientations in the present embodiment, expressions same as those of the first embodiment will be used hereinbelow.

As shown in FIG. 6, the capacitor element 200X of the present embodiment comprises an anode body 210, a dielectric layer 220, a cathode layer 240 and an anode lead wire 300X. The capacitor element 200X of the second embodiment has a structure similar to the structure of the capacitor element 200 of the first embodiment except for the anode lead wire 300X. Accordingly, a detail explanation thereabout will be omitted.

Figure 7:
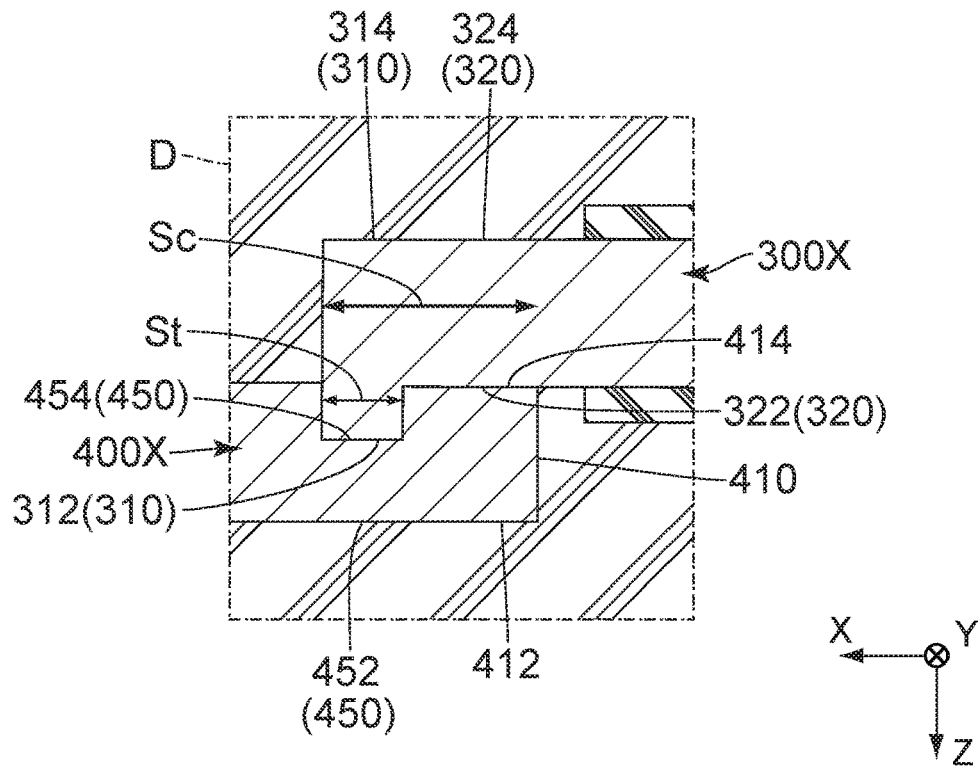
FIG. 7 is an enlarged view showing a part which is enclosed by dotted line D of FIG. 6.

Referring to FIGS. 6 and 7, the anode lead wire 300X of the present embodiment is made of tantalum. The anode lead wire 300X is partially embedded in the anode body 210 and extends in the horizontal direction from the anode body 210. A rear part of the anode lead wire 300X is embedded in the anode body 210. The anode lead wire 300X extends forward in the front-rear direction from the anode body 210. The anode lead wire 300X has a thicker portion 310 and a thinner portion 320. Dissimilar to the anode lead wire 300 of the first embodiment, the anode lead wire 300X of the present embodiment has no coupling portion 330. Specifically, in the anode lead wire 300X of the present embodiment, the thinner portion 320 and the thicker portion 310 are directly coupled with each other so that there is a step between the thinner portion 320 and the thicker portion 310.

Referring to FIGS. 6 and 7, a base metal of the anode terminal 400X of the present embodiment is copper. Specifically, the anode terminal 400X is formed by plating nickel on the copper base metal. The anode terminal 400X has a first end 410, a second end 420 and an overlapping portion 450. On the anode terminal 400X, the overlapping portion 450 is positioned closer to the second end 420 than the first end 410 is. In other words, the anode terminal 400X of the present embodiment has no additional overlapping portion 460 dissimilar to the anode terminal 400 of the first embodiment.

As shown in FIGS. 6 and 7, each of the first end 410 and the second end 420 of the present embodiment is a free end. The first end 410 has an upper surface 412 and a lower surface 414 in the up-down direction.

As shown in FIG. 7, the overlapping portion 450 of the present embodiment is positioned forward of the first end 410 in the front-rear direction. The overlapping portion 450 has an upper surface 452 and a lower surface 454 in the up-down direction.

As shown in FIG. 7, the anode terminal 400X is connected to the anode lead wire 300X under a state where the first end 410 of the anode terminal 400X is positioned on the thinner portion 320 while the overlapping portion 450 of the anode terminal 400X overlaps with the thicker portion 310. The upper surface 412 of the first end 410 of the anode terminal 400X and the upper surface 452 of the overlapping portion 450 of the anode terminal 400X are flush with each other. The upper surface 312 of the thicker portion 310 is in contact with the lower surface 454 of the overlapping portion 450 in the up-down direction. The upper surface 322 of the thinner portion 320 is in contact with the lower surface 414 of the first end 410 in the up-down direction.

Referring to FIG. 7, the thicker portion 310 has a size St in the horizontal direction, the solid electrolytic capacitor 100 has a junction which connects the anode terminal 400X and the anode lead wire 300X with each other, and the junction has a size Sc in the horizontal direction. The sizes St and Sc satisfy a condition St/Sc≤0.5. This facilitates a molten part of the anode terminal 400X, which is welded to the anode lead wire 300X, to be identified.

The solid electrolytic capacitor 100X of the present embodiment is manufactured as follows.

Similar to the solid electrolytic capacitor 100 of the first embodiment, the solid electrolytic capacitor 100X of the present embodiment is manufactured through a step 1 (formation step), a step 2 (arrangement step) and a step 3 (connection step). In other words, the manufacturing method of the solid electrolytic capacitor 100X comprises the formation step, the arrangement step and the connection step.

Referring to FIGS. 6 and 7, the formation step, through which the capacitor element 200X of the present embodiment is formed, is performed. Specifically, the capacitor element 200X is formed though the formation step, wherein: the capacitor element 200X comprises the anode body 210, the dielectric layer 220, the solid electrolytic layer 230, the conductive layer 570 and the anode lead wire 300X; the anode body 210 is formed of a valve metal; the dielectric layer 220 is formed on a surface of the anode body 210; the solid electrolytic layer 230 is formed on the dielectric layer 220; the conductive layer 570 is formed on the solid electrolytic layer 230; the anode lead wire 300X is partially embedded in the anode body 210 and extends in the horizontal direction from the anode body 210; the anode lead wire 300X has the thicker portion 310 and the thinner portion 320; the thinner portion 320 is positioned closer to the anode body 210 than the thicker portion 310 is in the horizontal direction; the thicker portion 310 has the upper surface 312 and the lower surface 314 in the up-down direction; the thinner portion 320 has the upper surface 322 and the lower surface 324 in the up-down direction; the lower surface 324 of the thinner portion 320 and the lower surface 314 of the thicker portion 310 are flush with each other; and the upper surface 322 of the thinner portion 320 is positioned below the upper surface 312 of the thicker portion 310 in the up-down direction perpendicular to the horizontal direction. In detail, in the anode lead wire 300X of the capacitor element 200X, the thinner portion 320 and the thicker portion 310 are directly coupled with each other so that there is the step between the thinner portion 320 and the thicker portion 310. The thicker portion 310 and the thinner portion 320 of the anode lead wire 300X are press formed by a die. However, the method of forming the capacitor element 200X, which includes the anode lead wire 300X, is not limited thereto, and the capacitor element 200X can be formed by any known method in the art.

Figure 8:
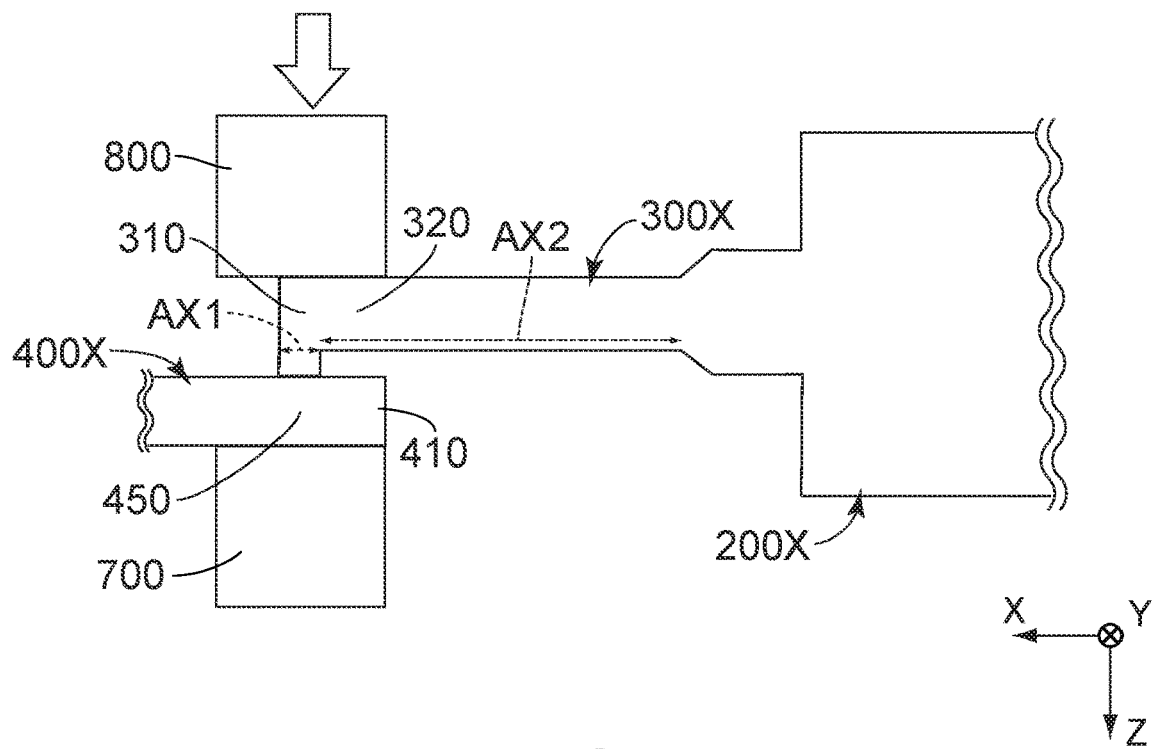
FIG. 8 is a cross-sectional view for explaining an arrangement process of a manufacturing method of the solid electrolytic capacitor of FIG. 6.

Referring to FIG. 8, the arrangement step is performed after the formation step is performed. Specifically, in the arrangement step, the anode terminal 400X is partially arranged on the anode lead wire 300X so that the first end 410 of the anode terminal 400X is positioned above the thinner portion 320 while the overlapping portion 450 of the anode terminal 400X, which is positioned closer to the second end 420 of the anode terminal 400X than the first end 410 of the anode terminal 400X is on the anode terminal 400X, overlaps with the thicker portion 310.

Figure 9:
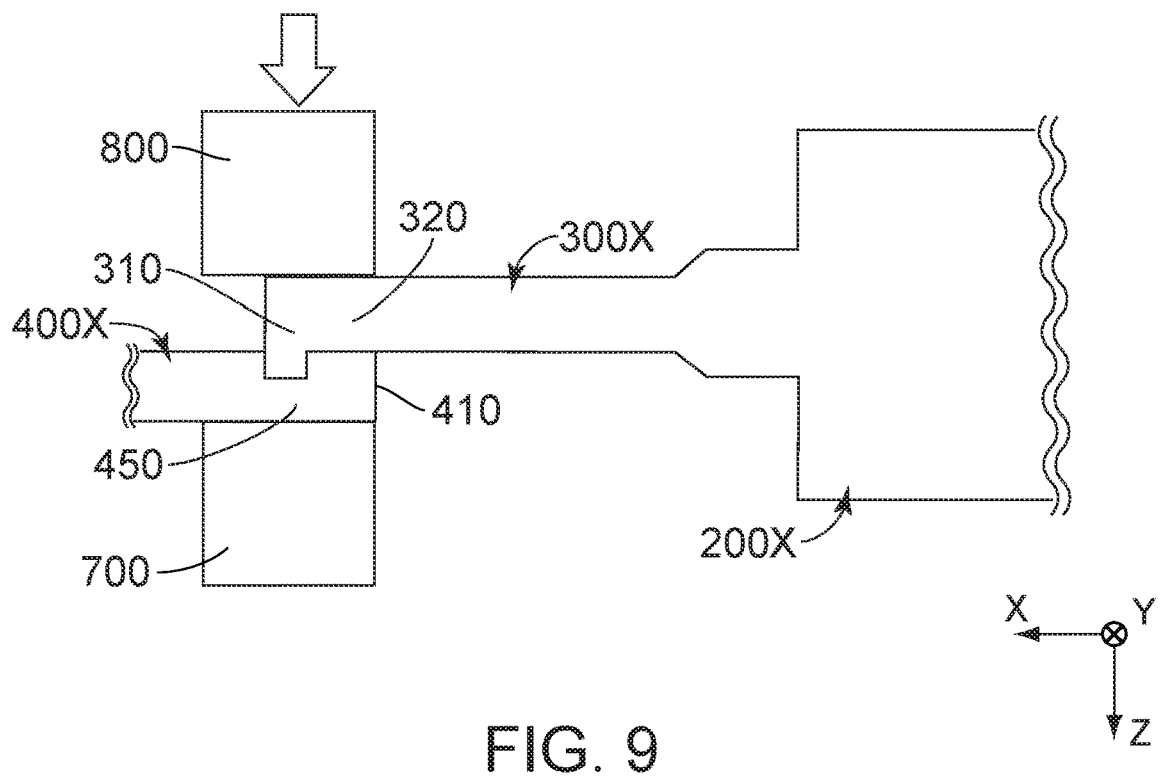
FIG. 9 is another cross-sectional view for explaining a connection process of the manufacturing method of the solid electrolytic capacitor of FIG. 6.
Figure 10:
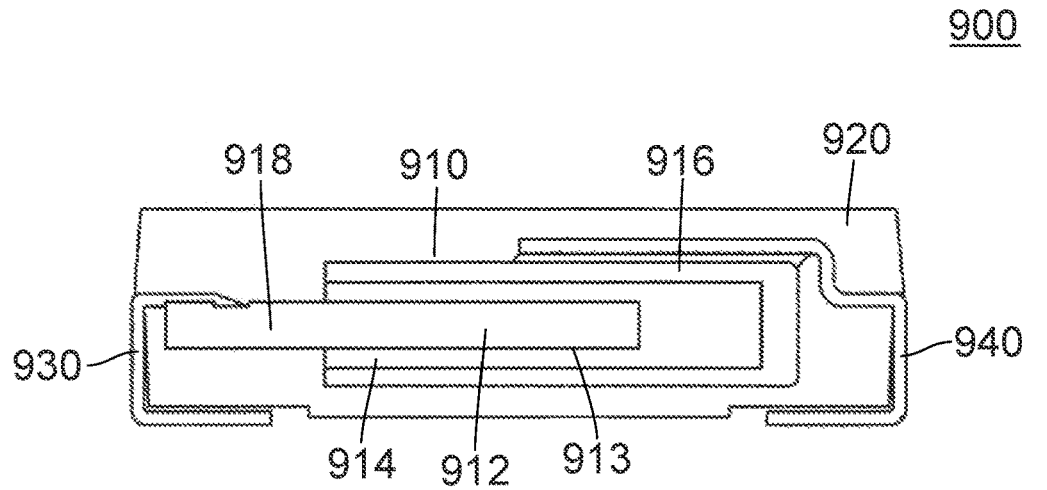
FIG. 10 is a cross-sectional view showing a solid electrolytic capacitor of Patent Document 1.

Referring to FIGS. 8 and 9, the connection step is performed after the arrangement step is performed. Specifically, in the connection step, the anode terminal 400X and the anode lead wire 300X are connected with each other by arranging an upper electrode 700 and a lower electrode 800 so that each of the upper electrode 700 and the lower electrode 800 occupies an area AX1 corresponding to the thicker portion 310 of the anode lead wire 300X in the horizontal direction while each of the upper electrode 700 and the lower electrode 800 partially occupies an area AX2 corresponding to the thinner portion 320 of the anode lead wire 300X in the horizontal direction, followed by putting the first end 410 of the anode terminal 400X and the thinner portion 320 of the anode lead wire 300X between the upper electrode 700 and the lower electrode 800 with the overlapping portion 450 of the anode terminal 400X and the thicker portion 310 of the anode lead wire 300X sandwiched between the upper electrode 700 and the lower electrode 800, further followed by applying electric current between the upper electrode 700 and the lower electrode 800 with force applied to both of the upper electrode 700 and the lower electrode 800 in the up-down direction to carry out resistance welding of the anode terminal 400X and the anode lead wire 300X to each other.

That is, in the connection step, the upper electrode 700 and the lower electrode 800 are firstly arranged so that each of the upper electrode 700 and the lower electrode 800 occupies the area A1 corresponding to the thicker portion 310 of the anode lead wire 300X in the horizontal direction while each of the upper electrode 700 and the lower electrode 800 partially occupies the area A2 corresponding to the thinner portion 320 of the anode lead wire 300X in the horizontal direction. Next, the first end 410 of the anode terminal 400X and the thinner portion 320 of the anode lead wire 300X are put between the upper electrode 700 and the lower electrode 800 while the overlapping portion 450 of the anode terminal 400X and thicker portion 310 of the anode lead wire 300X are sandwiched between the upper electrode 700 and the lower electrode 800. At this time, the upper electrode 700 is in contact with any of the upper surface 412 (see FIG. 7) of the first end 410 and the upper surface 452 (see FIG. 7) of the overlapping portion 450 in the up-down direction. Additionally, at this time, the lower electrode 800 is in contact with any of the lower surface 324 (see FIG. 7) of the thinner portion 320 and the lower surface 314 (see FIG. 7) of the thicker portion 310 in the up-down direction. Finally, in this state, electric current is applied between the upper electrode 700 and the lower electrode 800 while force is applied to both of the upper electrode 700 and the lower electrode 800 so that the upper electrode 700 and the lower electrode 800 approach each other in the up-down direction. Thus, the anode terminal 400X and the anode lead wire 300X are resistance welded to each other.

Referring to FIG. 7, in the solid electrolytic capacitor 100X manufactured through the connection step, the thicker portion 310 has the size St in the horizontal direction, the junction of the anode terminal 400X and the anode lead wire 300X has the size Sc in the horizontal direction, and the sizes St and Sc satisfy the condition St/Sc≤0.5. Thus, a contact area between the anode terminal 400X and the anode lead wire 300X at the beginning of the resistance welding of the anode terminal 400X and the anode lead wire 300X is not too large, and thereby weldability between the anode terminal 400X and the anode lead wire 300X is enhanced.

According to the manufacturing method of the present embodiment, the anode lead wire 300X is pressed against the molten anode terminal 400X as the welding of the anode terminal 400X and the anode lead wire 300X proceeds, and the anode terminal 400X and the anode lead wire 300X are brought into contact with each other not only at the thicker portion 310 but also at the thinner portion 320. In other words, the contact area between the anode terminal 400X and the anode lead wire 300X is increased as the welding of the anode terminal 400X and the anode lead wire 300X proceeds. This can prevent a resistance value of the junction of the anode terminal 400X and the anode lead wire 300X from becoming too high and thereby can prevent the anode terminal 400X from becoming too hot. Thus, the manufacturing method of the present embodiment prevents a molten portion of the anode terminal 400X from spreading to an area, where the anode body 210 is placed, when the anode terminal 400X and the anode lead wire 300X are resistance welded to each other.

It is assumed that a spherical molten portion is produced by melting of the anode terminal 400X in the connection step. In the manufacturing method of the present embodiment, the welding of the anode terminal 400X and the anode lead wire 300X begins at the thicker portion 310 which is positioned apart from the anode body 210. Accordingly, even if such a spherical molten portion is produced, the spherical molten portion is produced at a location which is positioned apart from the anode body 210. Thus, the solid electrolytic capacitor 100X, which is manufactured by the manufacturing method of the present embodiment, provides a long migration path for metal ions, which might be produced from such a spherical molten portion in high temperature and high humidity conditions, toward the cathode layer 240. Consequently, an insulation defect hardly occur in the solid electrolytic capacitor 100X which is manufactured by the manufacturing method of the present embodiment.

After the aforementioned steps are performed, the cathode terminal 500 is connected to the capacitor element 200X, and the capacitor element 200X is sealed with the outer insulating member 590. Thus, the manufacture of the solid electrolytic capacitor 100X of the present embodiment is completed.

Although the specific explanation about the present invention is made above referring to the embodiments, the present invention is not limited thereto and is susceptible to various modifications and alternative forms.

While there has been described what is believed to be the preferred embodiment of the invention, those skilled in the art will recognize that other and further modifications may be made thereto without departing from the spirit of the invention, and it is intended to claim all such embodiments that fall within the true scope of the invention.

What is claimed is:
1. A method of manufacturing a solid electrolytic capacitor comprising a capacitor element, an anode terminal and a cathode terminal, wherein: the capacitor element comprises an anode body, a dielectric layer, a solid electrolytic layer, a conductive layer and an anode lead wire; the anode body is formed of a valve metal; the dielectric layer is formed on a surface of the anode body; the solid electrolytic layer is formed on the dielectric layer; the conductive layer is formed on the solid electrolytic layer; the anode lead wire is partially embedded in the anode body and extends in a horizontal direction from the anode body; the anode lead wire has a thicker portion and a thinner portion; the thinner portion is positioned closer to the anode body than the thicker portion is in the horizontal direction; the thinner portion has an upper surface and a lower surface in an up-down direction perpendicular to the horizontal direction; the thicker portion has an upper surface and a lower surface in the up-down direction; the lower surface of the thinner portion and the lower surface of the thicker portion are flush with each other; the upper surface of the thinner portion is positioned below the upper surface of the thicker portion in the up-down direction; the anode terminal at least has a first end, a second end and an overlapping portion; on the anode terminal, the overlapping portion is positioned closer to the second end than the first end is; the anode terminal is connected to the anode lead wire under a state where the first end of the anode terminal is positioned on the thinner portion while the overlapping portion of the anode terminal overlaps with the thicker portion; the first end of the anode terminal has an upper surface in the up-down direction; the overlapping portion of the anode terminal has an upper surface in the up-down direction; and the upper surface of the first end of the anode terminal and the upper surface of the overlapping portion of the anode terminal are flush with each other, the method comprising:
a step of forming the capacitor element comprising the anode body, the dielectric layer, the solid electrolytic layer, the conductive layer and the anode lead wire, the anode body being formed of the valve metal, the dielectric layer being formed on the surface of the anode body, the solid electrolytic layer being formed on the dielectric layer, the conductive layer being formed on the solid electrolytic layer, the anode lead wire being partially embedded in the anode body and extending in the horizontal direction from the anode body, the anode lead wire having the thicker portion and the thinner portion, the thinner portion being positioned closer to the anode body than the thicker portion is in the horizontal direction, the thicker portion having the upper surface and the lower surface in the up-down direction perpendicular to the horizontal direction, the thinner portion having the upper surface and the lower surface in the up-down direction, the lower surface of the thinner portion and the lower surface of the thicker portion being flush with each other, and the upper surface of the thinner portion being positioned below the upper surface of the thicker portion in the up-down direction;
a step of partially arranging the anode terminal on the anode lead wire so that the first end of the anode terminal is positioned above the thinner portion while the overlapping portion of the anode terminal, which is positioned closer to the second end of the anode terminal than the first end of the anode terminal is on the anode terminal, overlaps with the thicker portion; and
a step of connecting the anode terminal and the anode lead wire with each other by arranging an upper electrode and a lower electrode so that each of the upper electrode and the lower electrode occupies an area corresponding to the thicker portion of the anode lead wire in the horizontal direction while each of the upper electrode and the lower electrode partially occupies an area corresponding to the thinner portion of the anode lead wire in the horizontal direction, followed by putting the first end of the anode terminal and the thinner portion of the anode lead wire between the upper electrode and the lower electrode with the overlapping portion of the anode terminal and the thicker portion of the anode lead wire sandwiched between the upper electrode and the lower electrode, further followed by applying electric current between the upper electrode and the lower electrode with force applied to both of the upper electrode and the lower electrode in the up-down direction to carry out resistance welding of the anode terminal and the anode lead wire to each other.

2. A solid electrolytic capacitor comprising a capacitor element, an anode terminal and a cathode terminal, wherein:
the capacitor element comprises an anode body, a dielectric layer, a solid electrolytic layer, a conductive layer and an anode lead wire;
the anode body is formed of a valve metal;
the dielectric layer is formed on a surface of the anode body;
the solid electrolytic layer is formed on the dielectric layer;
the conductive layer is formed on the solid electrolytic layer;
the anode lead wire is partially embedded in the anode body and extends in a horizontal direction from the anode body;
the anode lead wire has a thicker portion and a thinner portion;
the thinner portion is positioned closer to the anode body than the thicker portion is in the horizontal direction;
the thinner portion has an upper surface and a lower surface in an up-down direction perpendicular to the horizontal direction;
the thicker portion has an upper surface and a lower surface in the up-down direction;
the lower surface of the thinner portion and the lower surface of the thicker portion are flush with each other;
the upper surface of the thinner portion is positioned below the upper surface of the thicker portion in the up-down direction;
the anode terminal at least has a first end, a second end and an overlapping portion;
on the anode terminal, the overlapping portion is positioned closer to the second end than the first end is;
the anode terminal is connected to the anode lead wire under a state where the first end of the anode terminal is positioned on the thinner portion while the overlapping portion of the anode terminal overlaps with the thicker portion;
the first end of the anode terminal has an upper surface in the up-down direction;
the overlapping portion of the anode terminal has an upper surface in the up-down direction; and
the upper surface of the first end of the anode terminal and the upper surface of the overlapping portion of the anode terminal are flush with each other.

3. The solid electrolytic capacitor as recited in claim 2, wherein:
the thicker portion has a size St in the horizontal direction;
the solid electrolytic capacitor has a junction which connects the anode terminal and the anode lead wire with each other;
the junction has a size Sc in the horizontal direction; and
$St/Sc \leq 0.5$.

4. The solid electrolytic capacitor as recited in claim 2, wherein:
the anode lead wire has a coupling portion which couples the thinner portion and the thicker portion with each other;
the coupling portion has an intersecting surface;
the intersecting surface couples the upper surface of the thinner portion and the upper surface of the thicker portion with each other; and
the intersecting surface intersects with the up-down direction.

5. The solid electrolytic capacitor as recited in claim 2, wherein:
the anode lead wire is made of tantalum; and
a base metal of the anode terminal is copper.

* * * * *